United States Patent
Lethorn et al.

(10) Patent No.: US 10,267,369 B2
(45) Date of Patent: Apr. 23, 2019

(54) ARTICULATING BRAKE PISTON CAP FOR A BRAKE ASSEMBLY

(71) Applicant: Akebono Brake Industry Co., Ltd., Chuo-ku, Tokyo (JP)

(72) Inventors: Brad Robert Lethorn, Brighton, MI (US); Rory Hourihan, West Bloomfield, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 15/663,086

(22) Filed: Jul. 28, 2017

(65) Prior Publication Data

US 2019/0032735 A1    Jan. 31, 2019

(51) Int. Cl.
| | | |
|---|---|---|
| *F16D 55/46* | (2006.01) | |
| *F16D 65/00* | (2006.01) | |
| *F16D 65/14* | (2006.01) | |
| *F16D 55/02* | (2006.01) | |
| *F16D 55/00* | (2006.01) | |

(52) U.S. Cl.
CPC ......... *F16D 65/0006* (2013.01); *F16D 55/02* (2013.01); *F16D 65/14* (2013.01); *F16D 2055/0016* (2013.01); *F16D 2055/0075* (2013.01)

(58) Field of Classification Search
CPC ......... F16D 65/14; F16D 65/18; F16D 55/226
USPC .............................. 188/71.1–71.9, 72.1–72.9
See application file for complete search history.

(56) References Cited

U.S. PATENT DOCUMENTS

| | | | |
|---|---|---|---|
| 3,277,983 A | | 10/1966 | Jeffries |
| 3,566,997 A | | 3/1971 | Heck |
| 3,890,884 A | * | 6/1975 | Silberschlag ....... F16D 55/2255 188/196 P |
| 4,306,639 A | | 12/1981 | Mitchell |
| 4,375,250 A | * | 3/1983 | Burgdorf ................ F16D 65/18 188/72.2 |
| 4,401,012 A | * | 8/1983 | Emmett .................. F16D 65/14 188/264 G |
| 4,513,844 A | * | 4/1985 | Hoffman, Jr. ....... F16D 65/0006 188/264 G |
| 4,529,068 A | | 7/1985 | Gallo |
| 5,355,774 A | | 10/1994 | Ditlinger |
| 5,542,504 A | | 8/1996 | Berwanger |
| 5,713,435 A | * | 2/1998 | Schneider ............... F16D 65/14 188/264 G |
| 5,964,321 A | | 10/1999 | Hinkens |
| 6,085,636 A | * | 7/2000 | Ruckert ................... F16J 1/001 188/264 G |
| 6,491,138 B1 | * | 12/2002 | Spagele .................. F16D 55/14 188/70 B |
| 6,729,445 B1 | | 5/2004 | Qian et al. |

(Continued)

FOREIGN PATENT DOCUMENTS

| | | |
|---|---|---|
| GB | 1201314 A | 8/1970 |
| WO | 92/08898 A1 | 5/1992 |
| WO | 99/06729 A1 | 2/1999 |

*Primary Examiner* — Christopher P Schwartz (74) *Attorney, Agent, or Firm* — The Dobrusin Law Firm P.C.

(57) ABSTRACT

A brake piston that includes a body and a cap. The cap is free to move or pivot relative to the body. The body is adapted to generally maintain axial alignment with a piston bore that is adapted to support the brake piston, and the cap is free to move or pivot relative to the body and the piston bore.

20 Claims, 5 Drawing Sheets

(56) References Cited

U.S. PATENT DOCUMENTS

| | | | |
|---|---|---|---|
| 7,156,212 B1 | 1/2007 | Ciotti et al. | |
| 7,311,180 B2 * | 12/2007 | Baumann | F16D 65/18 |
| | | | 188/162 |
| 8,376,093 B2 * | 2/2013 | Chun | F16D 65/18 |
| | | | 188/72.7 |
| 9,285,003 B2 | 3/2016 | Cornolti et al. | |
| 9,441,690 B2 * | 9/2016 | Burgoon | F16D 65/847 |
| 2005/0126864 A1 * | 6/2005 | Boisseau | F16D 65/092 |
| | | | 188/72.2 |
| 2009/0045018 A1 * | 2/2009 | Baumgartner | F16D 65/14 |
| | | | 188/72.2 |
| 2010/0133050 A1 | 6/2010 | Arbesman et al. | |
| 2012/0222546 A1 | 9/2012 | Cannata | |
| 2014/0158480 A1 * | 6/2014 | Qian | F16D 55/226 |
| | | | 188/72.6 |

\* cited by examiner

ARTICULATING BRAKE PISTON CAP FOR A BRAKE ASSEMBLY

FIELD

These teachings relate to a brake piston, and more particularly to a brake piston that includes a body and a cap that is moveable relative to the body.

BACKGROUND

A brake assembly typically includes a brake caliper with a piston bore that is adapted to support a brake piston. The brake piston is adapted to move a brake pad against a moving component to create a clamping force. The clamping force may be used to slow, stop, or prevent movement of the moving component. In vehicular applications, the moving component may be a brake rotor.

Over time, the brake pad may wear unevenly—for example, where one edge of the brake pad wears more than another edge. Such uneven brake pad wear may cause the brake piston to cock or jam inside the piston bore, which may cause the brake piston to contact a surface of the piston bore, which may lead to undesirable noise, vibration, and harshness (NVH) issues; may cause the brake piston and/or the piston bore to prematurely wear; ands or may even cause the brake piston to seize inside the piston bore.

Moreover, during manufacturing and/or assembly of the brake assembly, the piston bore, and/or the brake piston, tight tolerances including perpendicularlity, flatness, and parallelism must be maintained in order to prevent or reduce chances of the brake piston contacting a surface of the piston bore, or the brake piston cocking or jamming inside the piston bore.

It may therefore be desirable to improve the current state of the art by providing a brake piston that can accommodate uneven brake pad wear and thus prevent or reduce chances of the brake piston contacting the piston bore; and/or prevent or reduce chances of the brake piston cocking or jamming inside the piston bore. By providing such a brake piston, undesirable noise, vibration, and harshness (NVH) issues may be reduced or prevented; brake piston and/or the piston bore wear may be reduced or prevented; and/or chances of a brake piston jamming or seizing in a piston bore may be reduced or prevented.

It may also be desirable to improve the current state of the art by providing a brake piston that can accommodate manufacturing and/or assembly tolerances and/or fluctuations in perpendicularity, flatness, and/or parallelism of the brake piston and/or caliper bore.

SUMMARY

These teachings provide a brake piston. The brake piston according to these teachings advantageously accommodates uneven brake pad wear, and thus advantageously prevents or reduces chances of the brake piston contacting a piston bore, or cocking or jamming inside the piston bore. These teachings also provide a brake piston that can advantageously accommodate manufacturing tolerances and/or fluctuations in perpendicularity, flatness, and/or parallelism of the brake piston and/or caliper bore to reduce or prevent chances of the brake piston contacting a surface of the piston bore, or cocking or jamming of the brake piston inside the piston bore. As can be appreciated, by providing such a brake piston, undesirable noise, vibration, and harshness (NVH) issues may be reduced or prevented; brake piston and/or the piston bore wear may be reduced or prevented; and/or chances of a brake piston jamming or seizing within a piston bore may be reduced or prevented.

The brake piston according to the teachings herein comprises a body and a cap. The cap is attached to the body in a way that provides or accommodates for movement of the cap relative to the body. That is, the cap is independently moveable relative to the body. Moveable as used herein, for example, may mean that the cap may articulate, rotate, pivot, slide, tip or otherwise move relative to the body, while the body maintains its position or does not move relative to the cap. For example, while the body may be axially moved along a center or longitudinal axis of the piston bore during a brake apply or release of the brake apply, the cap may be free to angularly move, or rotate, or pivot, tip, or articulate relative to the center or longitudinal axis of the body and/or piston bore. The cap is in contact with a brake pad such that during creation or release of the clamping force, if the brake pad or an end thereof wears unevenly, the cap may compensate for the wear and rotate, articulate, pivot, tip, or otherwise move relative to the body and the piston bore to accommodate for the uneven wear, while the body is maintained square inside the piston bore, or maintains its alignment with the center axis of the piston bore, thus reducing or preventing the body from contacting the piston bore.

These teaching provide a brake piston. The brake piston may be referred to as 2-piece brake piston, where the body is a first piece and the cap is the second piece. However, because the cap comprises two pieces, namely a halo and a topper, the brake piston may also be referred to as a 3-piece brake piston, where the body is a first piece, the topper is a second piece, and the halo is the third piece.

The brake piston according to the teachings herein comprises a body and a cap, wherein the cap is free to pivot relative to the body. The brake piston comprises a pivot joint located between the body and the cap. The pivot joint functions to connect together the body and the cap. The pivot joint functions to provide for or allow the cap to pivot or move relative to the body and the piston bore. The pivot joint may also function to or allow or provide for the cap to be axially moveable relative to the body. That is, the pivot joint may allow the cap to axially move along an axis of the piston bore or body towards and away from the body, while the body does not move.

The pivot joint comprises a ball and a socket. The ball is received in the socket. The body comprises a contact surface and the cap comprises a mating contact surface, and the contact surface and the mating contact surface match or correspond to one another. That is, the contacting surfaces may be perpendicular, angled, or canted relative to a center or longitudinal axis of the body and/or a center or longitudinal axis of the cap. The cap comprises a post on which the ball is located, and the body comprises the socket. During a brake apply, the body generally maintains axial alignment with a piston bore that is adapted to support the brake piston, and the cap is free to pivot relative to the body and the piston bore. In some configurations, the body and the cap may be made from the same materials. In other configurations, the body and the cap may be made from the same materials. For example, the body may be made from aluminum, while the cap may be made from steel, or vice versa. The stronger material used for the steel cap may be advantageous to provide a structurally rigid component for engaging and pushing against a brake pad, while the aluminum may be advantageous for the body to provide a lighter weight brake piston and less cost.

These teaching provide a method of assembling the brake piston. The method of assembling the brake piston comprises various steps discloses herein that may be performed in any order. Moreover, some of the steps may be combined together into a single step, while other steps may be split into multiple steps. Of course, some of the steps disclosed herein may be omitted all together.

The method of assembling the brake piston comprises a step of attaching a cap to a body such that the cap is free to pivot or otherwise move relative to the body. The method comprises a step of inserting the body into a piston bore defined in a brake caliper, and the step of attaching the cap to the body is before or after the step of inserting the body into the piston bore. The brake piston comprises a pivot joint that comprises ball and socket. During the attaching step, the method comprises a step of inserting the ball into the socket. The ball comprises flexible fingers. During the inserting step, the method comprises a step of flexing, bending, or compressing the fingers so that the ball can fit and/or can be inserted into the socket.

These teaching provide a brake assembly. The brake assembly comprises a brake caliper; a piston bore defined in the brake caliper, and the brake piston according to any of the teachings herein supported in the piston bore. The brake piston is arranged at an inboard side of a brake rotor. The brake caliper comprises a second piston bore defined in the brake caliper. The second piston bore is adapted to support a second brake piston according to any of the teachings herein. The second brake piston is arranged at the inboard side of the brake rotor, or the second brake piston is arranged at an outboard side of the brake rotor.

DETAILED DESCRIPTION

These teachings provide a brake assembly. The brake assembly may function to slow, stop, or prevent movement of a moving component, such as an axle, a hub, a rotor, a brake rotor, a road wheel, a vehicle, or a combination thereof. The vehicle may be virtually any vehicle, such as, for example: an automobile, a motorcycle, a riding lawn mower or tractor, an all-terrain vehicle (ATV), or the like. The brake assembly may also be used in non-vehicular applications to slow, stop, or prevent movement of a moving components such as, for example, a lathe, a winder for paper products or cloth, amusement park rides, wind turbines, or the like.

The brake assembly may be a disc brake. The disc brake may be a floating-type disc brake. A floating-type disc brake assembly generally includes one or more brake pistons supported at one side of a brake caliper or brake rotor. For example, the one or more brake pistons can be supported at an inboard side of the brake caliper and/or brake rotor or the outboard side. The brake assembly may be an opposed-piston-type disc brake. An opposed-piston-type disc brake assembly generally includes one or more brake pistons supported at, an inboard side of the brake caliper and/or brake rotor and one or more brake pistons supported at an outboard side of the brake caliper and/or brake rotor.

The brake assembly may be used to create a clamping force. Clamping force may be any force that functions to decelerate, slow, stop, and/or prevent movement or rotation of a moving component. The clamping force can be created by converting the kinetic energy of the moving component into thermal energy or heat by frictionally engaging one or more friction elements, such as brake pads against a moving component. In vehicular application, the clamping force may be created during a standard brake apply or application of the service brake by moving and frictionally engaging one or more brake pads or shoes against one or more sides of the brake rotor to slow, stop, or prevent movement of the brake rotor and thus the wheel and the vehicle. The clamping force may also be created during a parking brake apply by moving and frictionally engaging one or more brake pads against one or more sides of the brake rotor to prevent or restrict movement of a stopped or parked brake rotor and thus road wheel or vehicle.

These teachings provide a brake caliper. The brake assembly may comprise a brake caliper. The brake caliper may function to support one or more the components of the brake assembly. For example, the brake caliper may comprise one or more supports configured to engage and/or support one or more brake pads. The brake caliper may comprise one or more piston bores, each of which are adapted to support a brake piston according to the teachings herein. One or more piston bores may be defined in the brake caliper at an inboard side of the brake caliper relative to the brake rotor and/or one or more piston bores may be defined in the brake caliper at an outboard side of the brake caliper relative to the brake rotor. The brake caliper may move during a brake apply (i.e., a floating-type caliper), or the brake caliper may be fixed so that the brake caliper does not move during a brake apply (i.e., a fixed caliper). The brake caliper may be connected or mounted to any non-rotating or moving part of a vehicle, like a knuckle or a spider, which may be the casting that a disc brake system is mounted to.

These teachings provide a piston bore. The brake caliper may comprise one or more piston bores. A piston bore may define a generally hollow region in the brake caliper that is configured to receive and support a brake piston. A brake caliper can have one piston bore. A brake caliper can have two or more piston bores. One or more piston bore(s) can be located on only one side of the brake rotor (i.e., on only an inboard side of the brake caliper or brake rotor; or on only an outboard side of the brake caliper or brake rotor). One or more piston bores can be located on both sides of the brake rotor (e.g., on both the inboard and outboard sides of the brake caliper or brake rotor).

Each of the piston bores may include a center, central, or longitudinal axis that is generally perpendicular to a side of the brake rotor. In vehicle position, the central or longitudinal axis of each piston bole may extend generally in a cross-car direction. The piston bore may support a brake piston such that a central or longitudinal axis of the piston bore is generally collinear with or the same as a central or longitudinal axis of the body of the brake piston. The axes of the piston bore and the body may be maintained during a brake apply. As discussed herein, the cap is moveable relative to the body such that a central or longitudinal axis of the cap may move, or be different than, or angled relative to, a central or longitudinal axis of the body and/or piston bore.

These teachings provide a piston brake piston. The brake assembly may include one or more brake pistons. Each of the one or more brake pistons may be moved in a respective piston bore defined in the brake caliper. The one or more brake pistons may be adapted to move one or more brake pads, or the ends of one or more brake pads, against a moveable component, like a brake rotor, to create the clamping force. The one or more brake pistons may be moved by pressurizing brake fluid. The one or more brake pads may be moved with an electric motor and a corresponding rotary to linear stage mechanism located between the motor and the brake piston. The rotary to linear stage mechanism may include a screw or spindle that is rotated by the motor, which causes a nut to axially move along the screw or spindle and push the brake piston against a brake pad to move the brake pad against the moving component or brake pad. The brake piston may be referred to as 2-piece brake piston, where the body is a first piece and the cap is the second piece. However, because the cap comprises two pieces, namely a halo and a topper, the brake piston may also be referred to as a 3-piece brake piston, where the body is a first piece, the topper is a second piece, and the halo is the third piece. The brake piston generally comprises a body and a cap.

The brake piston comprises a body. The body is connected to the cap via a pivot joint. The body and the cap may be connected together before the assembled cap and body are inserted into the piston bore. Alternatively, the body may be inserted into the piston bore first, and then the cap may be attached to the body.

The body may comprise a central or longitudinal axis that is generally perpendicular to a side of the brake rotor. In vehicle position, the central or longitudinal axis the body may extend generally in a cross-car direction. The body may maintain its alignment in the piston bore during creation of the clamping force and/or during a free running condition where a clamping force is not being applied or maintained. In other words, when the brake piston or the body is stationary or is being moved to create or release clamping force, alignment of the central or longitudinal axis of the body may be generally or substantially maintained with, or may be collinear with, the central or longitudinal axis of the piston bore. Stated another way, other than moving axially along the central or longitudinal axis of the piston bore to create and release the clamping force, the body may generally or substantially not otherwise move in the piston bore. The body may be received in the piston bore such that the body is free from cocking or jamming in the piston bore during creation or release of the brake apply. The body may be received in the piston bore such that the body is free from contacting a surface of the piston bore during creation or release of the clamping force.

The body may comprise a rear end or surface. The rear end of the body may be the end of the body that does not touch or contact a brake pad. The rear end of the body may be the end that is opposite the end of the body that contacts the cap. The rear end of the body may comprise a cavity. The cavity may be adapted for the pressurized brake fluid to contact and move the brake piston and a brake pad to create clamping force. The rear end may include circular, rounded, or hemispherical projection that may be adapted to evenly distribute the pressurized brake fluid across the back end of the body so that the body maintains its alignment in the piston bore. This may advantageously prevent the body from cocking or jamming in the piston bore. The rear end that includes the circular, rounded, or hemispherical projection advantageously provides for a lightweight design of the body. The rear end that includes the circular, rounded, or hemispherical projection may also substantially counter or compliment a shape of the inner bore.

The body may comprise a front end or surface that is located or defined opposite the rear end or surface. The front end of the body may be the end that contacts or engages the cap. The front end of the body may at least partially extend out of the piston bore during a brake apply. The front end may comprise a contact surface that interacts, engages, or contacts a mating contact surface of the cap. The contact surface of the body may be angled or canted relative to a longitudinal axis of the body and/or piston bore so that the cap can move, pivot, or slide, along the contact surface of the body. Alternatively, the contact surface of the body may be generally perpendicular relative to a longitudinal axis of the body and/or piston bore.

The body may compress a recess. The recess may extend from the front end of the body towards the rear end of the body. The recess may extend from the front end and terminate at the socket. The recess may be defined by a cylindrical wall. The wall may be generally parallel to the central or longitudinal axis of the body. Alternatively, the wall may be angled or taper from the front end to the socket. The angle, identified as a in the following figures, may be on the order of about 5 degrees or more, 15 degrees or more, 20 degrees or more, 30 degrees or more, 45 degrees or more, or about 75 degrees or less. The angled or tapered wall of the recess may provide clearance for the cap and the post to move when the cap moves relative to the body. The angled or tapered wall may provide a larger landing for the ball and post to be inserted into the body during assembly of the brake piston.

The brake piston comprises a cap. The cap may be free to move relative to the body. Referring to the cap, move may mean that the cap may articulate, rotate, slide, reposition, tip, and/or pivot relative to the body, while the body is generally or substantially restricted from articulating, rotating, sliding, repositioning, pivoting and/or otherwise moving relative to the cap. The cap may rotate 360 degrees or less relative to the body. The cap may move, articulate, rotate, tip, and/or pivot about a fixed point. The fixed point may be the point or location where the ball is captured in the socket. The cap may perform any of the movements discussed herein during creation of the clamping force, after the clamping force is created, and/or during a free-running condition, where the clamping force is not being created or maintained.

The cap may comprise a central or longitudinal axis that, when assembled in the brake assembly, is generally perpendicular to a side of the brake rotor. In vehicle position, the central or longitudinal axis the cap may extend generally in a cross-car direction. When the brake piston or the body is moved, alignment of the central or longitudinal axis of the cap may be generally or substantially maintained with, or may be collinear with, the central or longitudinal axis of the piston bore and/or the body. When the brake piston or the body is moved, alignment of a center line or center axis of the cap may change or may be different than a center line or center axis of the piston bore and/or body. That is, an angle may be formed or defined between the central or longitudinal axis the cap and the center or longitudinal axis of the body and/or piston bore. The angle may depend on various considerations, such as the angle of the mating surfaces, the amount of wear of the brake pad or the ends of the brake pad, the distance that the brake pad moves out of the corresponding piston bore, etc. it is envisioned that the angle (identified as β in the following figures) defined between the central or longitudinal axis the cap and the center or longitudinal axis of the body and/or piston bore may be on the order of approximately 1 degree more, about 2 degrees or more, about 3 degrees or more, about 4 degrees or mores, even about 5 degrees, or more or about 10 degrees or less.

By providing for the cap to be moveable relative to the body, while the body is generally or substantially restricted from moving except for generally axially along a center or longitudinal axis of the piston bore to during creation and/or release of the clamping force, the cap may move to adjust its relative position relative to the brake pad to compensate for uneven wear of the break pad that may occur as a result of taper wear. Moreover, the cap may move to adjust its relative position relative to the body and/or piston bore to compensate for manufacturing and/or assembly tolerance variations. Advantageously, by having a cap that is free to move relative to an otherwise stationary body, the body and the brake piston as a whole, may be restricted or prevented from contacting or colliding with a side wall or surface of the piston bore, which may thus reduce or prevent the body and/or brake piston from cocking, jamming or otherwise seizing inside the piston bore, may reduce or prevent NVH issues, and/or may reduce or prevent premature wear of the brake piston and/or piston bore. The cap may perform any of the movements discussed herein during creation of the clamping force, after the clamping force is created, and/or during a free-running condition, where the clamping force is not being created or maintained.

The cap may comprise a topper and a halo. The topper and the halo may also be constructed as a single unitary piece; however, for manufacturing and assembly purposes, it may be advantageous to provide the cap as two discrete components the halo and topper.

The brake piston comprises a pivot joint. The pivot joint may function to connect together the body and the cap. The pivot joint may function to allow the cap and the body to move independently of each other. The pivot joint may function to allow or provide for the cap to move relative to the body. The pivot joint may function to allow or provide for the cap to move, pivot, articulate, rotate, tip, and/or slide relative to the body. The pivot joint may function to allow or provide for the cap to move axially towards or away from the body. The pivot joint comprises a ball that is received in a socket. The ball may be part of the cap and the socket may be part of the body, or vice versa.

The pivot joint comprises a socket. The socket may function to allow or provide for the cap to connect to the body. The socket may function to receive a mating component of the cap, like the ball, to connect the body and the cap. The socket may be an orifice, depression, aperture, cutout, void, or other feature that may function to receive and maintain a mating component of the cap like the ball, to connect the body and the cap. After the ball is received in the socket, the socket may function to maintain, restrict, and/or prevent removal of the ball from the socket so that the cap is restricted or prevented from being removed or separated from the cap.

The socket may have a size or diameter that accommodates the ball such that the ball is able to move in one or more directions. For example, the socket may have a shape and/or size such that the ball and cap are able to move, rotate, tip, and/or pivot in an up and down direction, a left and right direction, and/or a direction in between. For example, the socket may have a shape and/or size such that the ball and cap are restricted from axially moving relative to the body, but are free to pivot relative to the body. For example, the socket may have a shape and/or size such that the ball and cap are able to move axially relative to the body without the body moving. For example, the socket may have a shape and/or size such that the ball and cap are unable to move axially without the body moving. The socket may be sized such that other than rotating, the ball is restricted or prevented from moving linearly or axially relative to the body within the socket in a cross-car direction, in a fore-aft direction, or in a direction therebetween. Alternatively, the socket may be sized such that in addition to rotating, the ball is free to move linearly or axially relative to the body within the socket in a cross-car direction, in a fore-aft direction, or in a direction therebetween. This may be accomplished by having a socket size or diameter that is at least slightly larger (e.g., about 1 mm or more, about 1.5 mm or more, about 2 mm or more or about 5 mm or less) than a size or diameter of the ball.

The ball may extend from the cap, or from the topper. The ball may function to allow or provide for the cap to connect to the body. The ball may be received into the socket to connect the body and the cap. The ball may be a rigid or solid structure that is unable to be bent, flexed, compressed, or otherwise deformed. The ball may be a structure that is bendable, flexible, compressible, or otherwise deformable, which may aid in the assembly of the brake piston. The ball may be elastically deformable. For example, the ball may include one or more fingers that are flexible, moveable, bendable, compressible, deformable, etc.

The ball and/or the one or more fingers may have a size or cross-sectional area e.g., diameter) that is at least slightly larger (e.g., about 1 mm or more, about 1.5 mm or more, about 2 mm or more or about 5 mm or less) than an opening into the socket. The ball may be sufficiently large so that a force is required to pass through the opening, but sufficiently small so that the ball, upon deformation of the fingers, may pass through the opening. Therefore, the ball or the one or more fingers must be, flexed, compressed, biased, or otherwise deformed form a steady state position so that the ball can be inserted into the socket. After being inserted into the socket, the ball and/or the one or more fingers may flex, un-compress, or otherwise move back into their steady state, pre-deformed condition so that the ball is located or maintained in the socket. To remove or separate the cap from the body, the fingers may be flexed, compressed, biased, or otherwise deformed so that the ball fit through the opening into the socket. This may be accomplished by axially pulling the cap away from the body so that the edge or into the socket compresses the fingers so that the ball can be removed from the socket.

At a connection between the recess and the socket, the brake piston comprises an edge. The edge may function to compress, deflect, or otherwise move the fingers and/or the legs of the topper so that the ball can fit into the socket. After the ball is received in the socket, the edge may function to retain the ball in the socket, and thus maintain a relative position of the cap relative to the body. The edge may be an opening that has a size that is smaller than the size of the socket. The edge may be an opening that has a size that is smaller than the size of the ball.

The brake assembly may generally include one or more brake pads. The one or more brake pads may be moved against moving component, like a braking surface or a side of the brake rotor, to create the clamping force. The one or more brake pads may include one or more features (i.e. ears, projections, etc) that may engage or be engaged by the brake caliper to maintain the location of the brake pads relative to the brake rotor.

The one or more brake pads may include a friction material and a pressure plate. The one or more brake pads may be supported on the brake caliper so that the friction material faces a side of the moving component or brake rotor. The pressure plate may oppose the friction surface. One or more brake pistons or one or more brake caliper fingers may be in selective contact with the pressure plate of a corresponding brake pad. For example, in some cases, one or more brake pistons, or the front surfaces of the halo, topper, or cap may be in contact with the pressure plate of an inboard brake pad, and one or more brake caliper fingers may be in contact with the pressure plate of an outboard brake pad. In some cases, one or more brake pistons or the front surfaces of the halo, topper, cap may be in contact with the pressure place of an inboard brake pad, and one or mare brake pistons or the front surfaces of the halo, topper, or cap may be in contact with the pressure place of an outboard brake piston.

During a brake app y, or while applying the parking brake, the one or more brake pistons and/or the one or more fingers can move all or an end of a corresponding brake pad so that the corresponding friction material engages a corresponding side of the moving component or brake rotor to create the clamping force.

The distance that the one or more brake pads must be moved may depend on taper wear. Taper wear may be defined as the tendency of the friction material of a brake pad to wear unevenly during use. Taper wear may result in the inboard, outboard or both pressure plates, of the inboard, outboard or both brake pads no longer being parallel to the sides of a brake rotor. For example, during a brake apply, a parking brake apply, or both, a leading end of a brake pad may contact the brake rotor first and/or with greater force than the trailing end of the brake pad. This may cause the leading end to wear more, or wear faster, than the trailing end. Over time, the leading end of a brake pad will have moved a greater distance than the trailing end to sufficiently engage the brake rotor and create the clamping force. To compensate for these differences, it may be desirable to be able to be able to move the ends of a brake pad different distances and/or at different times to ensure a sufficient clamping force is created. Moving the ends of a brake pad different distances and/or at different times may be accomplished according to the teachings herein, by including utilizing the torque transferring assembly.

The brake rotor may cooperate with the components of the brake assembly to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both. The brake caliper may be arranged so that one or more brake pistons are located at the inboard side, one or more brake pistons are located at the outboard side, or both. The brake rotor may be the moving or moveable component discussed herein.

Figure 1:
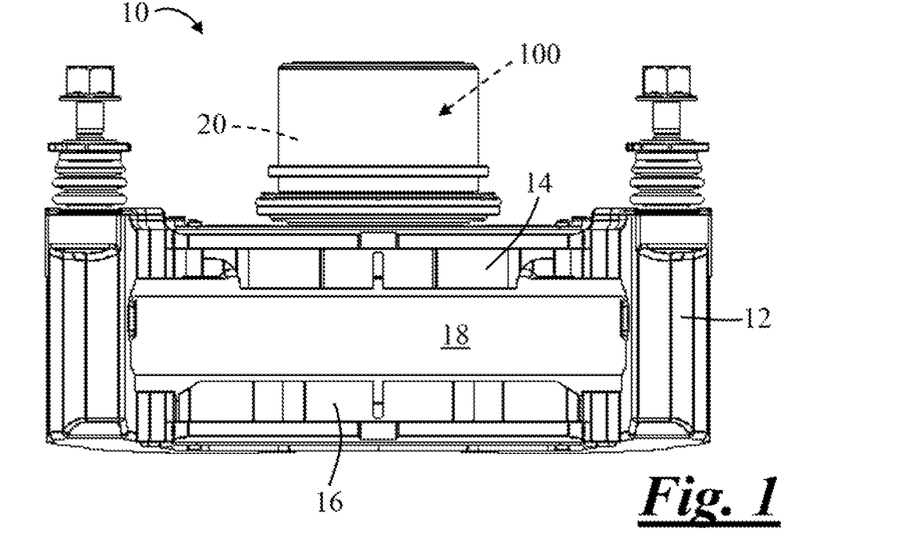
FIG. 1 is a top view of a brake assembly according to the teachings herein.

FIG. 1 illustrates a brake assembly 10 that is a floating-type of disc brake. The brake assembly 10 comprises a brake calliper 12 that supports an inboard brake pad 14 and an outboard brake pad 16. The brake pads 14, 16 are supported on opposing sides of a brake rotor 18. The brake caliper 12 includes a piston bore 20 located at the inboard side of the brake caliper 12 relative to the brake rotor 18. The piston bore 20 is adapted to support a brake piston 100. It is understood that the brake assembly 10 may include more than one piston bore 20, and thus more than one brake piston 100, located at the inboard side of the brake caliper 12. It is also understood that while the piston bore 20 and the brake piston 100 are positioned at the inboard side of the brake caliper 12, the piston bore 20 and the brake piston 100 may instead be located at the outboard side of the brake caliper 12.

To create a clamping force to slow or stop, movement of the brake rotor 18, the brake piston 100 is adapted to be moved in the piston bore 20 towards an inboard side of the brake rotor 18 and contact and move the inboard brake pad 14 against the inboard side of the brake rotor 18. Movement of the inboard brake pad 14 against the brake rotor 18 generates a reaction force that moves the brake caliper 12 along, the slide pins causing the outboard brake pad 16 to be moved against the outboard side of the brake rotor 18. When one or both of the brake pads 14, 16 contact the corresponding sides of the brake rotor 18, the kinetic energy of the brake rotor 18 is converted into thermal energy, which causes the brake rotor 18 to slow or stop rotating.

Figure 2:
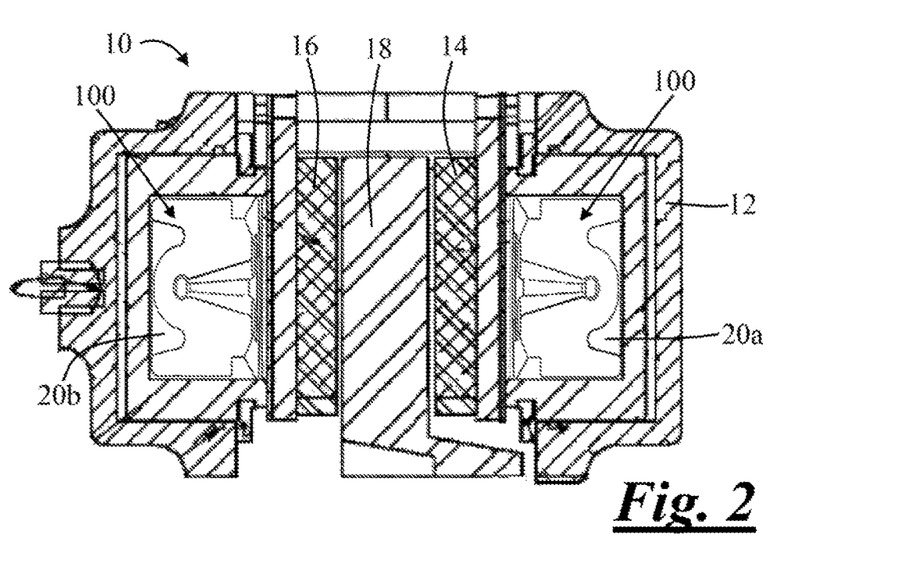
FIG. 2 is a cross-sectional view of another brake assembly according to the teachings herein.

FIG. 2 illustrates a brake assembly 10 that is an opposed-piston-type of disc brake. The brake assembly 10 comprises a brake caliper 12 that supports an inboard brake pad 14 and an outboard brake pad 16. The brake pads 14, 16 are supported on opposing sides of a brake rotor 18. The brake caliper 12 includes a piston bore 20a located at the inboard side of the brake caliper 12, and another piston bore 20b located at the outboard side of the brake caliper 12. Each piston bore 20a, 20b supports a brake piston 100. It is understood that the brake assembly 10 may include more than one piston bore 20a, 20b located on one or both sides of the brake rotor 18, and, as such, may include more than one brake piston 100 located at the inboard and/or outboard side of the brake caliper 12.

To create a clamping force to slow or stop movement of the brake rotor 18, the brake pistons 100 are adapted to be moved in the corresponding piston bores 20a, 20b towards the brake rotor 18 and thus contact and move the brake pads 14, 16 against the corresponding inboard and outboard sides of the brake rotor 18. When one or both of the brake pads 14, 16 contact the corresponding sides of the brake rotor 18, the kinetic energy of the brake rotor 18 is converted into thermal energy, which causes the rotating brake rotor 18 to slow or stop rotating.

Figure 3:
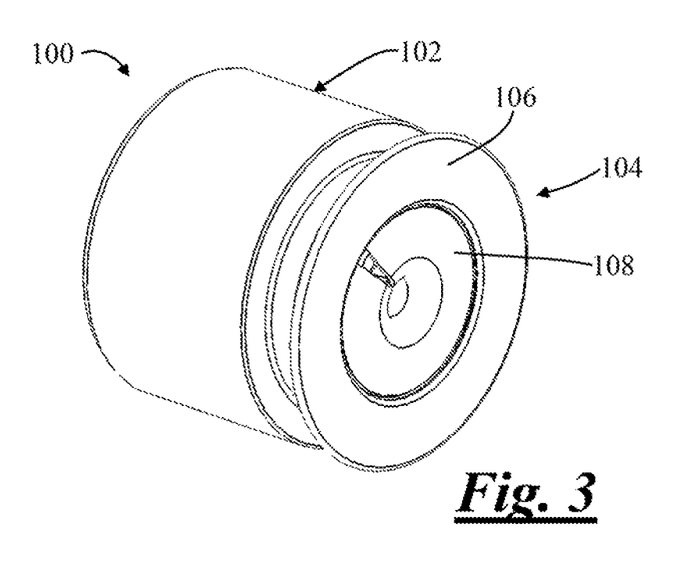
FIG. 3 is a perspective view of a brake piston that is included in the brake assembly of either or both of FIGS. 1 and 2.

FIG. 3 illustrates the brake piston 100. The brake piston 100 comprises a body 102 and a cap 104. The cap 104 comprises a halo 106 and a topper 108.

Figure 4:
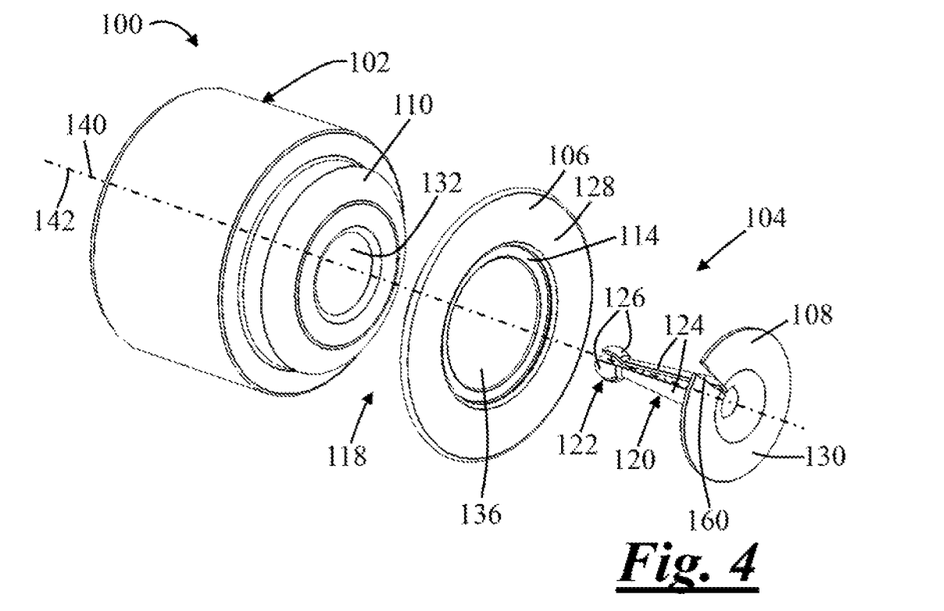
FIG. 4 is an exploded view of the brake piston of FIG. 3.
Figure 5:
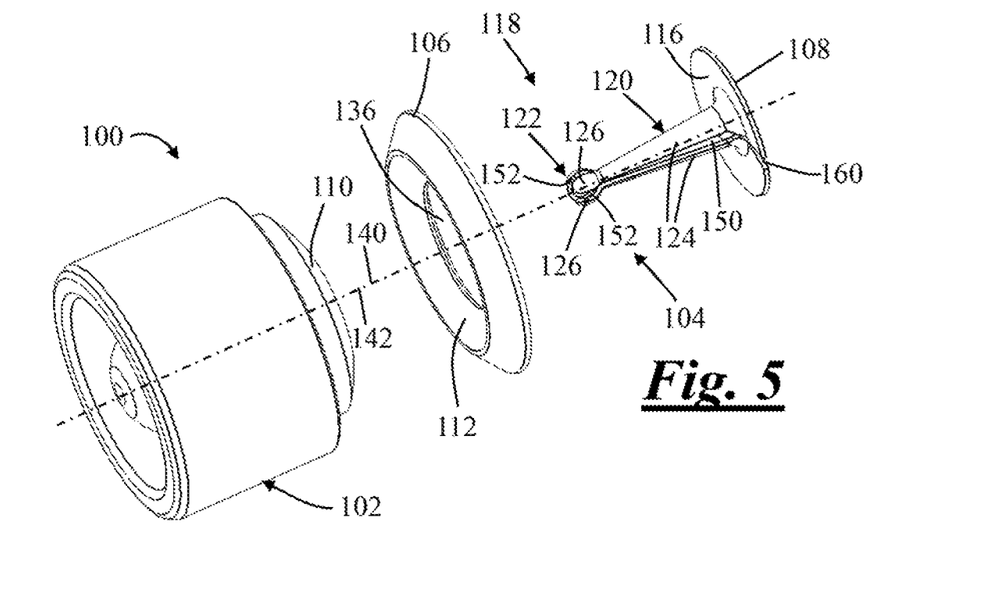
FIG. 5 is an exploded view of the brake piston of FIG. 3.
Figure 8A:
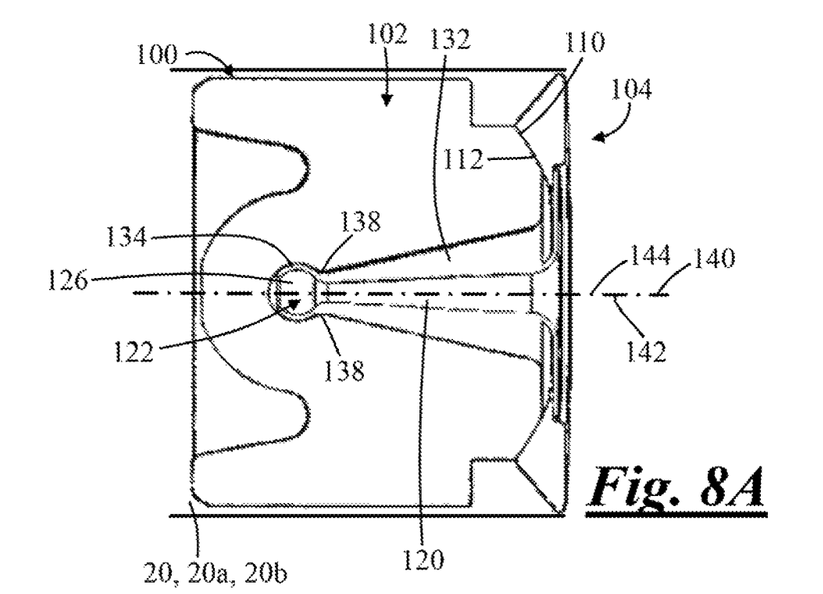
FIG. 8A is a section view of the brake piston of FIG. 3.
Figure 8B:
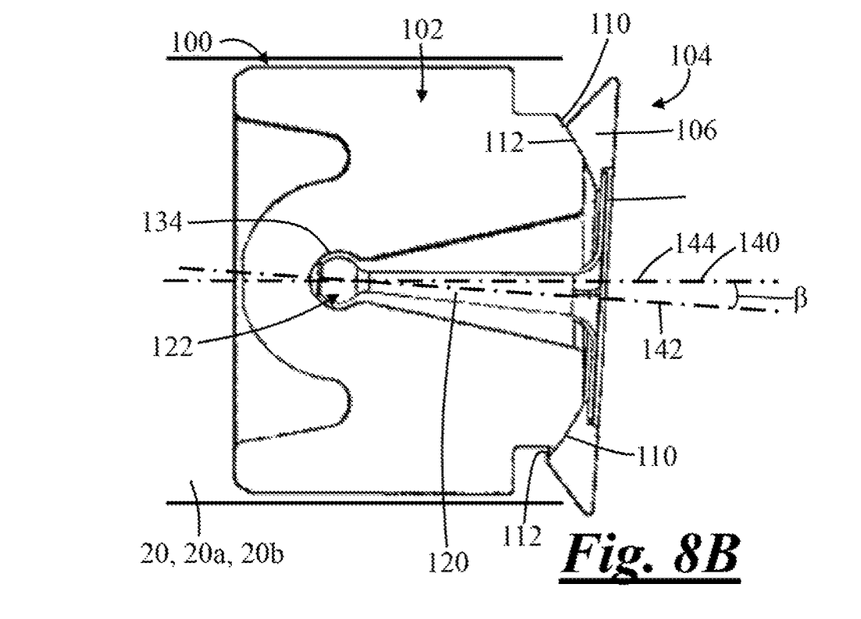
FIG. 8B is a section view of the brake piston of FIG. 3.

FIGS. 4 and 5 each illustrate the brake piston 100. The body 102 comprises a contact surface 110 that engages a mating contact surface 112 of the halo 106 or cap 104 when the brake piston 100 is assembled (FIGS. 3, 8A, and 8B). The body 102 includes a recess 132. The halo 106 comprises a rim 114 on which a back surface 116 of the topper 108 contacts or rests against when the brake piston 100 is assembled (FIGS. 3, 8A, and 8B). The brake piston 100 comprises a pivot joint 118 for connecting the body 102 and the cap 104. The body 102 extends along a body longitudinal or center axis 142, and the cap 104 extends along a cap longitudinal or center axis 140. The pivot joint 118 comprises a ball 122 and a socket 134 (See FIGS. 6, 8A, and 8B).

The topper 108 comprises a post 120 that extends from the back surface 116 of the topper 108 and terminates at the ball 122. The post 120 comprises at least one leg 124, and the ball 122 comprises at least one finger 126. If there are a plurality of legs 124, adjacent legs 124 are separated by a slit or absence of material 150 that allows for the legs 124 to deform or compress during assembly or disassembly of the brake piston 100, and then return to their steady-state positions after assembly or disassembly. If there are a plurality of fingers 126, adjacent fingers 126 that are each separated by a slit or absence of material 152 that allows for the fingers 126 to deform or compress during assembly or disassembly of the brake piston 100, and then return to their stead-state positions after assembly or disassembly.

The halo 106 and the topper 108 comprise respective front surfaces 128, 130 that are adapted to contact a corresponding brake pad 14 or 16 illustrated in FIGS. 1 and 2. The topper 108 also comprises a slit or absence of material 160 that may function to allow the legs 124 and/or the fingers 126 to deform or compress during assembly or disassembly of the brake piston 100. The slit or absence of material 160 may also be formed as a byproduct of the manufacturing of the topper 108. That is, the topper 108 may be formed from a spring clip that is initially a flat sheet of metal that is then rolled into the geometry illustrated in the figures.

Figure 6:
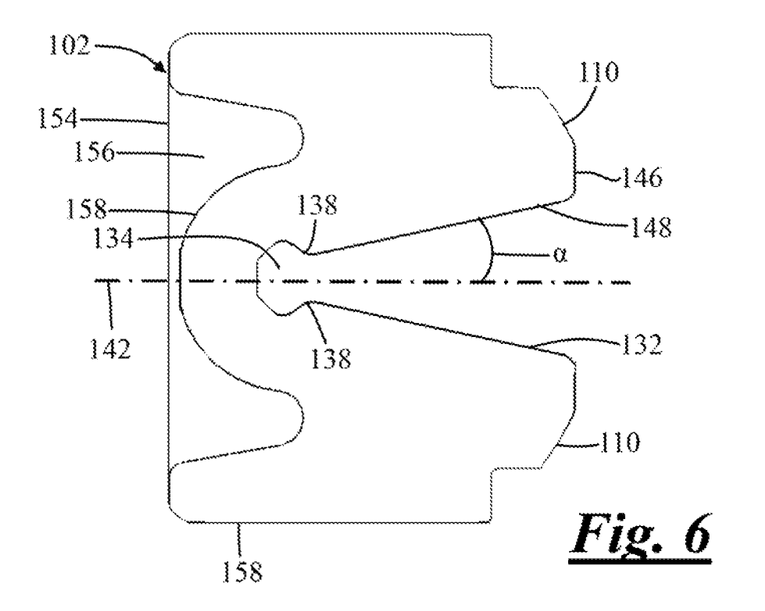
FIG. 6 is a section view of the body of the brake piston of FIG. 3.
Figure 7:
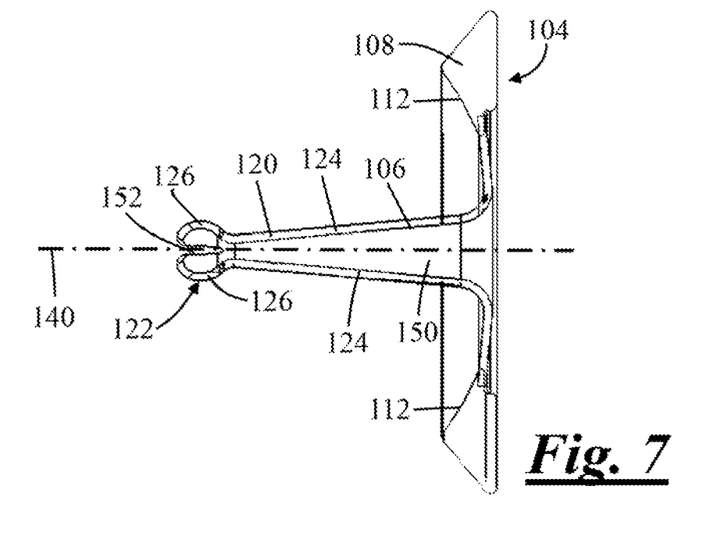
FIG. 7 is a section view of the cap of the brake piston of FIG. 3.

FIG. 6 illustrates the body 102 of the brake piston 100. The body 102 includes a front end 146 and a rear end 154. The body 102 comprises a cylindrical wall 158 extending between and connecting the front end 146 and the rear end 154. The recess 132 extends from the front end 146 towards the rear end 154, but terminates at the socket 134. The recess 132 is defined by a wall 148. Relative to the body axis 142, the wall 148 may taper at an angle α from the front end 146 to the socket 134. At the intersection of the recess 132 and the socket 134, the body 102 includes an edge 138 that is adapted to compress the fingers 126 of tire ball 122 (FIG. 7) during assembly of the brake piston 100, and then retain the ball 122 in the socket 134 when the brake piston 100 is assembled. The contact surface 110 of the body 102 substantially matches or corresponds to the contact surface 112 of the cap 104 (FIG. 7). The contact surface 110 of the body 102 is angled or canted relative to a center or body longitudinal axis 142 of the body 102. At the rear end 154 of the body 102, the body 102 comprises a cavity 156. Within the cavity 156, the body 102 comprises a rounded or hemispherical protrusion 158. During a brake apply, brake fluid is pressurized in the cavity 156 and acts on the walls defining the cavity 156 and the protrusion 158 to move the brake piston 100 and the corresponding brake pad 14 or 16 against the brake rotor 18.

FIG. 7 illustrates the cap 104. As was described above, the cap 104 comprises a halo 106 and topper 108. The halo 106 and topper 108 can be a single, integral component. The post 120 terminates at the ball 122. The post 120 includes a plurality of legs 124, and adjacent legs 124 are separated by a slit 152 (e.g., an absence of material). The ball 122 includes a plurality of fingers 126, and adjacent fingers 126 are separated by a slit 152. The contact surface 112 of the halo 106 or cap 104 are angled or canted relative to a center or cap longitudinal axis 140 of the cap 104.

FIG. 8A illustrates the brake piston 100. During assembly of the brake piston 100, the ball 122 and the post 120 are inserted through the opening 136 in the halo 106 (FIGS. 4 and 5) and into the recess 132 of the body 102 until the ball 122 contacts the edge 138, which causes the one or more fingers 126 and/or legs 124 to flex or compress so that the ball 122 can fit into the socket 134. After the ball 122 is received in the socket 134, the fingers 126 un-compress and return to their steady state position, and the edge 138 traps or restricts the ball 122 from being axially removed from the socket 134. The cap 104 can be assembled to the body 102 before or after the body 102 is received into the piston bore 20, 20a, 20b (FIGS. 1 and 2). During disassembly of the brake piston 100, the cap 104 can be pulled in a direction away from the socket 134 so that the ball 122 contacts the edge 138, which causes the one or more fingers 126 to flex or compress so that the ball 122 can be removed from within the socket 134. After the ball 122 is removed from the socket 134, the fingers 126 and/or legs 124 un-compress and return to their steady state position.

With continued reference to 8A, a condition is illustrated where a center or longitudinal axis 140 of the cap 104 is aligned with or collinear with a center or longitudinal axis 142 of the body 102 and with a center or longitudinal axis 144 of the piston bore 20, 20a, or 20b. This condition may occur before, during, or after a clamping force has been created, especially when the brake pads are new and/or when the friction surface of the brake pads are straight and/or when no taper wear is present.

Referring to FIG. 8B, a condition is illustrated where the center or longitudinal axis 140 of the cap 104 is angled or otherwise different than the center or longitudinal axis 142 of the body 102 and angled or otherwise different than the center or longitudinal axis 144 of the piston bore 20, 20a, or 20b. During this condition, an angle β may be defined between the longitudinal or center axis 142 and the other longitudinal or center axis 140, 144. This condition may occur during creation of the clamping force when the brake piston 100 is moved out of the piston bore 20, 20a, 20b. This condition may occur when the ball 122 moves within the socket 134 and the mating contact surface 112 of the halo 106 or cap 102 slides or moves relative to the contact surface 110 of the body 102. This condition may occur before, during, or after a clamping force has been created, especially if the brake pads are worn or uneven and/or when the friction surface of the brake pads are angled and/or when taper wear is present. Accordingly, during this condition, the body 102 generally or substantially maintains its centered alignment relative to the piston bore 20, 20a, 20b, while the cap 104 moves, pivots, or articulates relative to the body 102 and the piston bore 20, 20a, 20b. Advantageously, because the cap 104 moves, pivots, or articulates relative to the body 102, while the body 102 maintains its alignment in the piston bore 20, 20a, 20b, the body 102 is restricted from jamming or cocking or otherwise touching the caliper bore 20, 20a, 20b, and, accordingly, noise, vibration, and harshness (NVH) issues may be reduced or prevent; and/or premature wear of the brake piston 102 and/or caliper bore 20, 20a, 20b may be reduced or prevented.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps. The disclosure of "a" or "one" to describe an element or step is not intended to foreclose additional elements or steps. By use of the term "may" herein, it is intended that any described attributes that "may" be included are optional.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake piston comprising:
   a body comprising a body contact surface located at a front end of the body; and
   a cap connected to the body, the cap comprising a cap contact surface that is in contact with the body contact surface;
   wherein the body contact surface is angled relative to a longitudinal axis of the body; and
   wherein the cap contact surface is configured to directly slide on the body contact surface during movement of the cap relative to the body.

2. The brake piston according to claim 1, wherein the brake piston comprises a pivot joint comprising a member and socket, the member is configured to compress during insertion of the member into the socket.

3. The brake piston according to claim 2, wherein the member comprises one of more flexible fingers.

4. The brake piston according to claim 1, wherein the cap contact surface is angled relative to the longitudinal axis of the body, and
   wherein an angle of the cap contact surface relative to the longitudinal axis of the body substantially matches an angle of the body contact surface relative to the longitudinal axis of the body.

5. The brake piston according to claim 1, wherein the cap comprises a ball, and the body comprises a socket that is configured to receive the ball, and
   wherein the ball comprises flexible fingers that are configured to compress during insertion of the ball into the socket, the fingers are configured to un-compress after the ball is received into the socket.

6. The brake piston according to claim 1, wherein the body comprises a recess at the front end of the body, the body contact surface radially surrounds the recess.

7. The brake piston according to claim 1, wherein the body comprises a rear end that opposes the front end, the rear end comprises a cavity, and
   wherein during a brake apply, brake fluid acts on the cavity to move the brake piston.

8. The brake piston according to claim 1, wherein the body contact surface forms an angle relative to the longitudinal axis of the body that is less than 90 degrees.

9. The brake piston according to claim 1, wherein the body contact surface extends from a front-most end of the body.

10. The brake piston according to claim 1, wherein the cap contact surface forms an angle relative to the longitudinal axis of the body that is less than 90 degrees.

11. A brake piston comprising:
    a cap; and
    a body extending along a longitudinal axis, the body comprising a recess defined within the body, the recess extends along a center longitudinal axis that is generally aligned with the longitudinal axis of the body, the body comprises a socket defined at a back end of the recess;
    wherein the cap comprises a member that is received in the socket of the body; and
    wherein the cap is configured to move axially along the longitudinal axis of the body and also move angularly relative to the longitudinal axis of the body.

12. The brake piston according to claim 11, wherein, at a rear end of the body, the brake piston comprises a cavity and a rounded protrusion located within the cavity.

13. The brake piston according to claim 11, wherein the recess extends from a front end of the body towards a rear end of the body, the recess comprises walls that taper as the recess extends from the front end of the body to the socket.

14. The brake piston according to claim 11,
    wherein the member is configured to compress during insertion of the member into the socket, the member is configured to un-compress after the member is received into the socket.

15. The brake piston according to claim 11, wherein a front edge of the body comprises an angled contact surface;
    wherein the cap comprises an angled contact surface that is configured to at least partially contact the angled contact surface of the body, and
    wherein the angled contact surface of the cap is configured to slide on the angled contact surface of the body during movement of the cap relative to the body.

16. The brake piston according to claim 15, wherein the angled contact surface of the cap forms an angle relative to the longitudinal axis of the body that is less than 90 degrees, and
    wherein the angle of the angled contact surface of the cap relative to the longitudinal axis of the body substantially matches an angle of the angled contact surface of the body relative to the longitudinal axis of the body.

17. A brake assembly comprising:
    a brake piston comprising:
    i) a body comprising a front edge having a contact surface;
    ii) a cap comprising a contact surface that is configured to contact the contact surface of the body; and
    iii) a pivot joint, the pivot joint comprises a compressible member extending from the cap, and a socket that is an opening defined in the body, the compressible member is configured to be received in the socket.

18. The brake assembly according to claim 17, wherein the body comprises a recess that extends from the front edge of the body to the socket, and walls defining the recess taper as the recess extends from the front edge to the socket.

19. The brake assembly according to claim 17, wherein a center longitudinal axis of the body passes through the socket.

20. The brake assembly according to claim 17, wherein the contact surface of the cap forms an angle relative to a longitudinal axis of the body that is less than 90 degrees, and
    wherein the angle of the contact surface of the cap relative to the longitudinal axis of the body substantially matches an angle of the contact surface of the body relative to the longitudinal axis of the body.

* * * * *